United States Patent [19]

Brown et al.

[11] 4,310,243

[45] Jan. 12, 1982

[54] SPECTROPHOTOMETER WITH PHOTOMULTIPLIER TUBE DARK SIGNAL COMPENSATION

[75] Inventors: James R. Brown, Garden Grove; Allen M. Diamond, Huntington Beach, both of Calif.

[73] Assignee: Beckman Instruments, Inc., Fullerton, Calif.

[21] Appl. No.: 86,388

[22] Filed: Oct. 19, 1979

[51] Int. Cl.³ .......................... G01J 3/00; G01J 1/44; H01J 40/14
[52] U.S. Cl. .................................... 356/300; 250/207; 330/9; 330/259; 356/323; 356/325; 356/326
[58] Field of Search ........................ 356/300, 319–334, 356/336; 250/207; 330/9, 129, 144, 259, 284

[56] References Cited

U.S. PATENT DOCUMENTS 2,253,976  8/1941  Guanella .................................. 330/9
3,684,378  8/1972  Lord ....................................... 356/323

*Primary Examiner*—Vincent P. McGraw
*Attorney, Agent, or Firm*—R. J. Steinmeyer; Robert R. Meads; John R. Shewmaker

[57] ABSTRACT

In a spectrophotometer including a photomultiplier tube and an operational amplifier responsive to the current from the photomultiplier tube for generating a DC voltage proportional to light intensity, a method and means for simultaneously compensating for the dark current of the photomultiplier tube and the offset of the operational amplifier so that the output voltage of the operational amplifier is zero volts under dark conditions.

7 Claims, 1 Drawing Figure

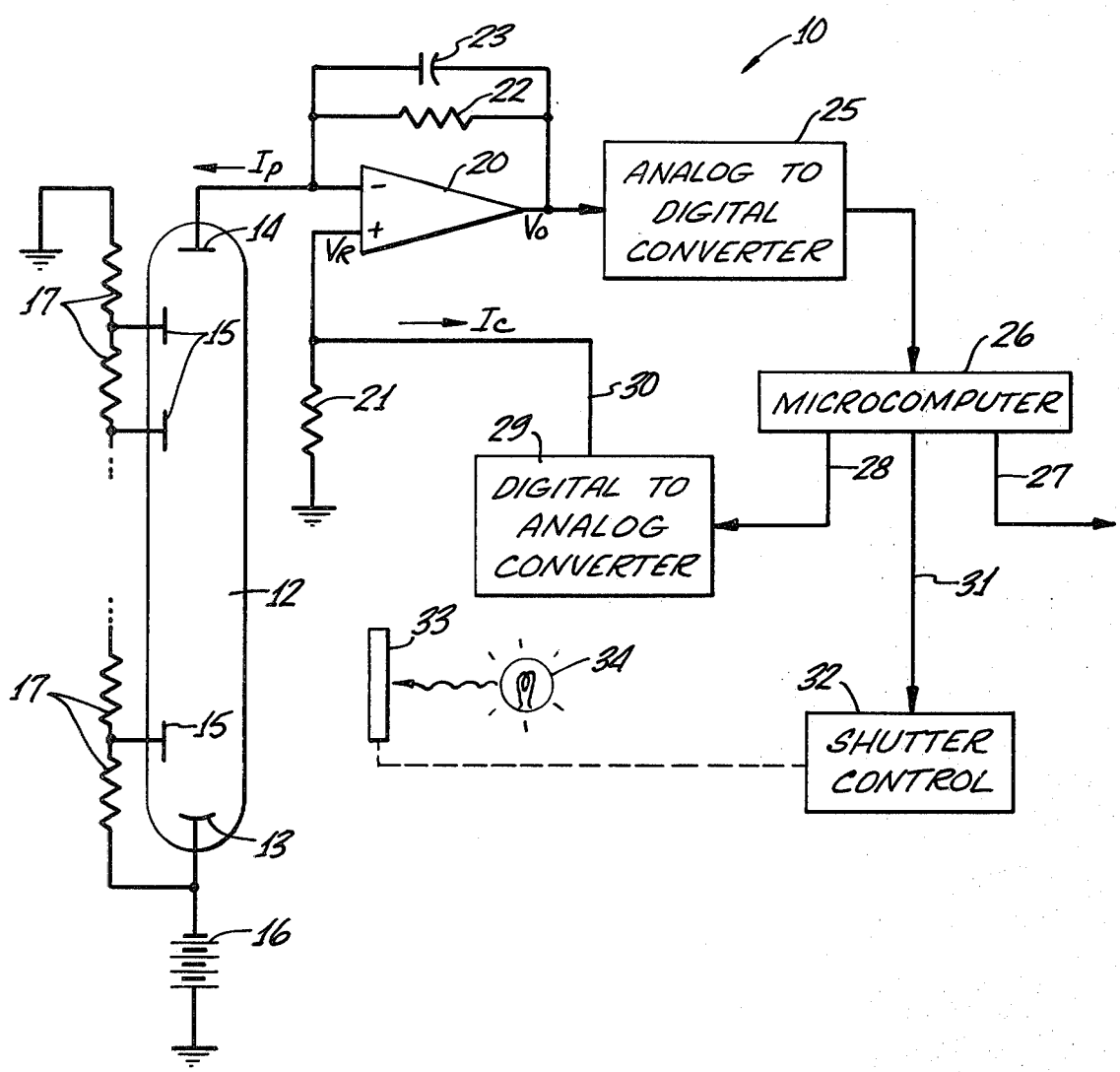

SPECTROPHOTOMETER WITH PHOTOMULTIPLIER TUBE DARK SIGNAL COMPENSATION

BACKGROUND OF THE INVENTION

1. Field of the Invention

The present invention relates to a method and means for compensating for the photomultiplier tube dark signal in a spectrophotometer and, more particularly, to a method and means for simultaneously compensating for the dark current of a photomultiplier tube and the offset of an operational amplifier in a spectrophotometer.

2. Description of the Prior Art

In a spectrophotometer, a beam of light of a known frequency is transmitted through a sample and a photomultiplier tube is positioned to detect the light passing through the sample. The less light absorbed by the sample, the more light is transmitted, and the output of the photomultiplier tube is a current signal proportional to the intensity of the detected light. Thus, the output of the photomultiplier tube is proportional to transmittance.

An operational amplifier is typically used to convert this current signal into a DC voltage signal. Such an operational amplifier typically has inverting and non-inverting inputs and an output whereupon the current from the photomultiplier tube is applied to the inverting input of the operational amplifier.

Photomultiplier tubes respond virtually instantaneously to light level changes and while this characteristic is generally desirable, it is undesirable in the sense that noise signals also affect the tube current and these signals are transmitted to the operational amplifier. In order to filter this noise, a low pass filter is generally coupled between the inverting input and the output of the operational amplifier so that the output of the operational amplifier responds slowly to current changes from the photomultiplier tube. A typical filter network might introduce a delay such that it takes approximately one-half second for the output of the operational amplifier to stabilize.

The use of an operational amplifier and a low pass filter for converting the current of a photomultiplier tube to a DC voltage creates a problem when compensating for the dark current of the photomultiplier tube. That is, under dark conditions, when there should be no light falling on the photomultiplier tube, there is still a current flowing therethrough, referred to as the dark current, and this current produces a proportional voltage at the output of the operational amplifier. An offset must be subtracted from this voltage to obtain a zero output voltage under dark conditions. In the past, various schemes have been utilized to compensate for the dark current of the photomultiplier tube so as to reduce the output voltage of the operational amplifier to zero volts under dark conditions. Such compensation techniques generally must be iterative, i.e. a compensation signal is applied to the circuit, the output voltage of the operational amplifier is sensed to determined whether it has been reduced to zero, and, if it has not, the compensation signal is adjusted and the output voltage of the operational amplifier again sensed. This procedure repeats until the output voltage of the operational amplifier is reduced to zero.

All such prior compensation techniques have left the filter network within the compensation loop so that the delay between successive iterations must be at least the one-half second it takes for the output of the amplifier to stabilize. When using a microcomputer with its rapid calculating capabilities to analyze the output of a spectrophotometer photomultiplier tube, such delay is undesirable in that compensation often requires several seconds to achieve.

SUMMARY OF THE INVENTION

According to the present invention, there is provided a method and means for compensating for the dark current of a photomultiplier tube which maintains the normal slow signal response to changes in the output of the photomultiplier tube but permits rapid compensation of the dark signal. Following the teachings of the present invention, not only is the dark current of the photomultiplier tube compensated for, but the offset of the operational amplifier is also compensated for. That is, even if the dark current from the photomultiplier tube were indeed zero, there might still be an output voltage from the operational amplifier. This, too, is compensated by using the teachings of the present invention. Accordingly, the advantage of the present invention is the effective removal of the long signal time constant from the dark signal compensation procedure, allowing rapid compensation and using a very simple circuit.

Briefly, the present invention comprises a method and means for simultaneously compensating for the dark current of a photomultiplier tube and the offset of an operational amplifier so that the output voltage of the operational amplifier is zero volts under dark conditions. Where the current from the photomultiplier tube is applied to the inverting input of the operational amplifier and a low pass filter is coupled between the inverting input and the output of the operational amplifier, the output voltage from the operational amplifier is applied to a microcomputer which, if the voltage is other than zero, applies a feedback voltage to the non-inverting input of the operational amplifier so as to reduce the output voltage to zero. This approach effectively bypasses the filter network so that the output of the operational amplifier responds instantaneously. The procedure then repeats until the output voltage reaches zero.

OBJECTS, FEATURES, AND ADVANTAGES

It is therefore an object of present invention to solve the problems associated with rapidly compensating for the dark current of a photomultiplier tube while maintaining the normal, slow signal response. It is a feature of the present invention to solve these problems by applying a compensation signal to the photomultiplier tube circuit at a location where it bypasses the circuit filter network. An advantage to be derived is that the long signal time constant is effectively removed from the dark signal compensation loop. A further advantage is that rapid compensation can be made of the phototube dark current. A still further advantage is that the photomultiplier tube dark current and the offset of the operational amplifier may be compensated for simultaneously.

Still other objects, features, and attendant advantages of the present invention will become apparent to those skilled in the art from a reading of the following detailed description of the preferred embodiment constructed in accordance therewith, taken in conjunction with the accompanying drawings wherein:

BRIEF DESCRIPTION OF THE DRAWINGS

The sole FIGURE is a block diagram of apparatus constructed in accordance with the teachings of the present invention.

DESCRIPTION OF THE PREFERRED EMBODIMENT

Referring now to the drawing, there is shown spectrophotometer apparatus, generally designated 10, constructed in accordance with the teachings of the present invention. Apparatus 10 includes a conventional photomultiplier tube 12 including a cathode 13, an anode 14, and a plurality of dynodes 15. Cathode 13 is connected to one terminal of a voltage source 16, the other terminal of which is connected to ground. Bias for dynodes 15 is provided by means of a plurality of resistors 17 connected in series between voltage source 16 and ground. The taps between resistors 17 are connected to dynodes 15. This is a conventional means of biasing a photomultiplier tube.

Anode 14 of photomultiplier tube 12 is connected to the inverting input of an operational amplifier 20 which functions as a preamplifier, the non-inverting input of which is connected via a resistor 21 to ground. The output of operational amplifier 20 is fed back to the inverting input thereof, typically by means of a resistor 22 and a capacitor 23. Resistor 22 and capacitor 23 function as a low pass filter and establish a time constant for operational amplifier 20 which is effective in filtering noise. This is necessary because photomultiplier tube 12 typically responds virtually instantaneously to light level intensity changes and it is desirable to eliminate from the output of operational amplifier 20 rapid changes resulting from noise. Typically, the values of resistor 22 and capacitor 23 are such that it takes approximately one-half second for the output of operational amplifier 20 to stabilize after a change in output current from photomultiplier tube 12.

The output of operational amplifier 20 is applied to an analog-to-digital converter 25 which converts the analog DC output voltage from preamplifier 20 to a digital signal. This signal is applied to a microcomputer 26 which may be any of the conventional types presently on the market having storage, calculation, and instruction issuing capabilities. Microcomputer 26 is capable of producing, on a line 27, an output signal indicative of transmittance as determined by the output of converter 25. Microcomputer 26 is also capable of generating, on a line 28, the digital equivalent of a current for compensating for the dark current signal of photomultiplier tube 12 and the offset of operational amplifier 20. This signal is applied via a digital-to-analog converter 29 to the non-inverting input of operational amplifier 20. Digital-to-analog converter 29 converts the digital signal on line 28 to an analog current on a line 30 which passes through resistor 21 to ground and generates a reference voltage at the non-inverting input of operational amplifier 20.

Microcomputer 26 also has the capability of forwarding control signals over lines 31 to a shutter control 32 which is mechanically connected to a shutter 33. Thus, upon a suitable signal from microcomputer 26, shutter control 32 moves shutter 33 in the path of the light source 34 for spectrophotometer apparatus 10.

In operation, photomultiplier tube 12 causes a current $I_p$ to flow between anode 14 thereof and the inverting input of operational amplifier 20. This current includes the dark current of tube 12 and the current due to light falling on tube 12. The current $I_p$ is converted by amplifier 20 to a DC output voltage $V_o$ with a time constant equal to RC, the normal signal response time consant, where R is the resistance of resistor 22 and C is the capacitance of capacitor 23.

It is desired that under dark conditions, the output voltage $V_o$ of operational amplifier 20 be zero volts. Normally, $V_o$ would be other than zero volts because of the dark current of photomultiplier tube 12 and the offset of operational amplifier 20.

According to the present invention, to compensate for the dark current of photomultiplier tube 12 and the offset of operational amplifier 20, microcomputer 26 first signals shutter control 32 to close shutter 33 to block all light from photomultiplier tube 12. Photomultiplier tube 12 responds virtually instantaneously, reducing $I_p$ to the dark current. Assuming that $V_o$ is other than zero volts, the analog voltage is converted to a digital equivalent by converter 25 and applied to microcomputer 26. Microcomputer 26 generates an approximately correct digital feedback signal which is converted by digital-to-analog converter 29 to a compensation current $I_c$ which flows through resistor 21. Current $I_c$ generates a reference voltage $V_R$ at the non-inverting input of operational amplifier 20. For high precision, the adjustment of $V_R$ must be iterative, i.e. microcomputer 26 checks $V_o$ after each change in $I_c$. The procedure of sensing $V_o$ and changing $I_c$ continues until the output voltage $V_o$ of amplifier 20 has been adjusted to zero volts.

It will be apparent to those skilled in the art that for the circuit configuration shown, the response of operational amplifier 20 and converter 25 to changes in $I_c$ made by microcomputer 26 and converter 29 is not the RC time constant, but is a much faster response because the feedback signal bypasses the low pass filter. Thus, after the initial $I_p$ decay to the dark level, corrective iterations may be made rapidly, at the speed commonly encountered with microcomputers.

It can therefore be seen that according to the present invention, there is provided a method and means for compensating for the dark current of photomultiplier tube 12 which maintains a normal slow signal response to changes in the output of tube 12 but permits rapid compensation of the dark signal. Following the teachings of the present invention, not only is the dark current of tube 12 compensated for, but also the offset of operational amplifier 20 is compensated for. Accordingly, the primary advantage of the present invention is the effective removal of the long signal time constant from the dark signal compensation procedure, allowing rapid compensation and using a very simple circuit.

While the invention has been described with respect to the preferred physical embodiment constructed in accordance therewith, it will be apparent to those skilled in the art that various modifications and improvements may be made without departing from the scope and spirit of the invention. For example, while the present invention has been described as a method and means for compensating for the photomultiplier tube dark signal in a spectrophotometer, it will be apparent that it has applicability to other circuits wherever a low pass filter with a long time constant is used. Accordingly, it is to be understood that the invention is not to be limited by the specific illustrative embodiment, but only by the scope of the appended claims.

We claim:

1. In a spectrophotometer including a source of light, a detector responsive to said light for producing a signal proportional to the intensity thereof, and an operational amplifier responsive to the signal from said detector for generating an output signal proportional to intensity, said operational amplifier having inverting and non-inverting inputs and an output, the signal from said detector being applied to said inverting input of said operational amplifier, and a low pass filter coupled between said inverting input of said operational amplifier and said output thereof for filtering the signal applied to said inverting input, the improvement comprising:
   means for establishing a dark condition for said detector; and
   feedback means for adjusting the output signal of said operational amplifier to zero volts during said dark condition, said means including means responsive to said output signal of said operational amplifier during said dark condition for generating a reference voltage, means for applying said reference voltage to said non-inverting input of said operational amplifier for reducing said output signal to zero, and means for determining whether said reference voltage reduces said ouput signal to zero and for adjusting said reference voltage until said output signal is reduced to zero.

2. In a spectrophotometer according to claim 1, the improvement wherein said means for establishing a dark condition comprises a shutter controllable to selectively block the light path between said source of light and said detector.

3. In a spectrophotometer according to claim 1 or 2, the improvement wherein a resistor is connected to said non-inverting input of said operational amplifier and wherein said feedback means feeds back a current through said resistor.

4. In a spectrophotometer according to claim 1 or 2, the improvement wherein said feedback means comprises:
   an analog-to-digital converter responsive to said output signal of said operational amplifier for converting said output signal to a digital signal;
   calculator means responsive to said digital signal for generating a digital feedback signal; and
   a digital-to-analog converter for converting said digital feedback signal to an analog reference signal.

5. In a spectrophotometer including a source of light, a detector responsive to said light for producing a signal proportional to the intensity thereof, an operational amplifier responsive to the signal from said detector for generating an output signal proportional to intensity, said operational amplifier having inverting and non-inverting inputs and an output, the signal from said detector being applied to said inverting input of said operational amplifier, and a low pass filter coupled between said inverting input of said operational amplifier and said output thereof for filtering the signal applied to said inverting input, a method for simultaneously compensating for dark current of said detector and offset of said operational amplifier so that said output signal of said operational amplifier is zero volts under dark conditions, comprising the steps of:
   establishing a dark condition for said detector;
   sensing the value of said output signal from said operational amplifier during said dark condition;
   feeding back to the non-inverting input of said operational amplifier a reference signal for reducing said output signal to zero; and
   repeating the above steps until said output signal is zero.

6. A method according to claim 5, wherein said step of establishing a dark condition comprises blocking the light path between said source of light and said detector.

7. A method according to claim 5 or 6, wherein said step of feeding back a reference signal to said operational amplifier comprises the steps of:
   converting said output signal to a digital signal;
   calculating from said digital signal the value of a digital reference signal; and
   converting the value of said digital reference signal to an analog signal for application to said operational amplifier.

* * * * *